US010498596B2

(12) United States Patent
Ulrich et al.

(10) Patent No.: US 10,498,596 B2
(45) Date of Patent: Dec. 3, 2019

(54) TERMINAL DEVICE AND METHOD FOR RADIO-NETWORK-SCAN OPERATION

(71) Applicant: GEMALTO M2M GMBH, Munich (DE)

(72) Inventors: Thomas Ulrich, Bad Dürkheim (DE); Volker Breuer, Boetzow (DE); Lars Wehmeier, Falkensee (DE)

(73) Assignee: GEMALTO M2M GMBH, Munich (DE)

( * ) Notice: Subject to any disclaimer, the term of this patent is extended or adjusted under 35 U.S.C. 154(b) by 559 days.

(21) Appl. No.: 15/037,177

(22) PCT Filed: Nov. 17, 2014

(86) PCT No.: PCT/EP2014/074724
§ 371 (c)(1),
(2) Date: May 17, 2016

(87) PCT Pub. No.: WO2015/078712
PCT Pub. Date: Jun. 4, 2015

(65) Prior Publication Data
US 2016/0285683 A1    Sep. 29, 2016

(30) Foreign Application Priority Data
Nov. 29, 2013   (EP) .................... 13195125

(51) Int. Cl.
*H04L 12/24* (2006.01)
*H04W 48/16* (2009.01)
*H04W 60/00* (2009.01)

(52) U.S. Cl.
CPC ........ *H04L 41/0806* (2013.01); *H04W 48/16* (2013.01); *H04W 60/00* (2013.01)

(58) Field of Classification Search
CPC ............ H04L 41/0803; H04L 41/0806; H04L 41/085; H04L 41/0866; H04W 48/16; H04W 60/00; H04W 8/00
See application file for complete search history.

(56) References Cited

U.S. PATENT DOCUMENTS

2005/0043026 A1   2/2005   Brok et al.
2005/0113028 A1   5/2005   Uchida et al.
(Continued)

OTHER PUBLICATIONS

*3rd Generation Partnership Project; Technical Specification Group Services and System Aspects; Quality of Service (QoS) concept and architecture (Release 11), 3GPP TS 23.107 v11.0.0, Jun. 2012, 42 pages.

(Continued)

*Primary Examiner* — Kibrom T Hailu
(74) *Attorney, Agent, or Firm* — Buchanan Ingersoll & Rooney PC (57) ABSTRACT

The invention comprises an operating method of a terminal device, which is configured for radio communication via different frequency bands, in performing a network scan, the method comprising: receiving a command for starting a network scan; in response to receiving the command, attempting a synchronization with predefined control channels on all frequency bands receivable by the terminal device or on a subset thereof comprising a plurality of the frequency bands, and, upon successful synchronization with a respective one of the control channels, ascertaining respective network-configuration information provided via the respective control channel by a respective network; determining, using the network-configuration information ascertained, an estimate of a quantity indicative of an achievable data throughput, hereinafter throughput estimate, associated with the respective ascertained network-configuration information; generating and providing an output, which is indica- (Continued)

tive of at least one of the determined throughput estimates for the respective network configurations.

17 Claims, 3 Drawing Sheets

(56) References Cited

U.S. PATENT DOCUMENTS

| | | | |
|---|---|---|---|
| 2009/0068969 A1 | 3/2009 | Lindoff et al. | |
| 2009/0161599 A1* | 6/2009 | Haartsen | H04W 56/00 370/326 |
| 2009/0180429 A1* | 7/2009 | Stevens | H04L 5/0023 370/329 |
| 2010/0118196 A1* | 5/2010 | Lee | H04N 5/50 348/569 |
| 2011/0013530 A1* | 1/2011 | Rinne | H04J 11/0069 370/252 |
| 2011/0117909 A1 | 5/2011 | Cao et al. | |
| 2012/0066366 A1 | 3/2012 | Blaisdell | |
| 2012/0099460 A1* | 4/2012 | Murakami | H04W 72/082 370/252 |
| 2012/0289163 A1* | 11/2012 | Fu | H04W 48/16 455/62 |
| 2012/0322504 A1 | 12/2012 | Chou et al. | |
| 2013/0100928 A1* | 4/2013 | Matsumori | H04W 36/24 370/331 |
| 2013/0252606 A1* | 9/2013 | Nimbalker | H04B 17/309 455/434 |
| 2014/0029516 A1* | 1/2014 | Heo | H04W 72/0453 370/328 |
| 2014/0153497 A1* | 6/2014 | Brisebois | H04W 28/18 370/329 |
| 2014/0160955 A1* | 6/2014 | Lum | H04W 24/06 370/252 |

OTHER PUBLICATIONS

*3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331 v11.5.0, Sep. 2013, 347 pages.

*Kawser, et al., "Downlink SNR to CQI Mapping for Different Multiple Antenna Techniques in LTE", International Journal of Information and Electronics Engineering, vol. 2, No. 5, Sep. 2012, pp. 757-760.

*3rd Generation Partnership Project; Technical Specification Group Radio Access Network; Evolved Universal Terrestrial Radio Access (E-UTRA); Physical layer procedures (Release 10), 3GPP TS 36.213 v10.1.0, Mar. 2011, 115 pages.

*3rd Generation Partnership Project; Technical Specification Group Radio Access Network; Physical layer procedures (FDD) (Release 5), 3GPP TS 25.214 v5.11.0, Jun. 2005, 51 pages.

*3rd Generation Partnership Project; Technical Specification Group GSM/EDGE Radio Access Network; Radio subsystem link control (Release 1999), 3GPP TS 05.08 v8.23.0, Nov. 2005, 100 pages.

*3rd Generation Partnership Project; Technical Specification Group Radio Access Network; Radio Resource Control (RRC); Protocol specification (Release 10), 3GPP TS 25.331 v10.11.0, Mar. 2013, 1,897 pages.

*International Search Report (PCT/ISA/210) dated Feb. 13, 2015, by the European Patent Office as the International Searching Authority for International Application No. PCT/EP2014/074724.

*Written Opinion (PCT/ISA/237) dated Feb. 13, 2015, by the European Patent Office as the International Searching Authority for International Application No. PCT/EP2014/074724.

* cited by examiner

TERMINAL DEVICE AND METHOD FOR RADIO-NETWORK-SCAN OPERATION

The present invention relates to a mobile terminal device, which is configured for radio communication via different frequency bands and which comprises a radio communication unit, which is configured to perform a network scan. The invention is further related to an operating method of such a terminal device and to a communication device comprising such a terminal device and a user interface device.

Some terminal devices of this kind, which are known in the art, support a network-scan feature called "informal network scan". An operating method implementing this known feature comprises detecting, which cellular radio-access network provides coverage at a given moment in time. The feature is based on detecting signal strengths of GSM and UMTS network cells by the terminal device.

This network-scan feature is useful for instance in an application case of a meter-application device comprising such a terminal device. It allows the meter-application device determining networks providing radio network services and currently detectable, for performing transmission or reception operations a scheduled transmission of data from the meter to an application server of a meter-service provider.

In contrast, the present invention proposes an operating method of a terminal device, which is configured for radio communication via different frequency bands, further being configured to control access to a plurality of identification and authentication modules or to a multi-network identification and authentication module, in performing a network scan, the method comprising:

receiving a command for starting a network scan;
in response to receiving the command, attempting a synchronization with predefined control channels on all frequency bands receivable by the terminal device or on a subset thereof comprising a plurality of the frequency bands, and, upon successful synchronization with a respective one of the control channels, ascertaining respective network-configuration information provided via the respective control channel by a respective network;
determining, using the network-configuration information ascertained, an estimate of a quantity indicative of an achievable data throughput, hereinafter throughput estimate, associated with the respective ascertained network-configuration information;
generating and providing an output, which is indicative of at least one of the determined throughput estimates for the respective network configurations,
after providing the output, waiting for an input indicative of a selection of the at least one of the output network configurations.

In accordance with the operating method of the present invention, the terminal device ascertains network-configuration information and determines an estimate of a quantity indicative of an achievable data throughput associated with respective ascertained network-configuration information. In contrast to previously known methods such as the "informal network scan", the operating method of the first aspect of the present invention allows determining beforehand, which data throughput can be achieved in the networks detected.

The solution of the operating method of the present invention is based on attempting a synchronization with predefined controlled channels on all frequency bands receivable by the terminal device, or at least on a subset thereof. Successful synchronization with a respective one of the controlled channels is followed by ascertaining respective network configuration information provided via the respective control channel by a respective network. Based on this data, the throughput estimate of a respective network configuration is determined, and an output is generated and provided, which indicates the determined throughput estimates for the respective network configurations.

The throughput is understood as an average rate of successful data delivery over a communication channel. This data may be delivered over a physical link or over a logical link, or it may pass through a certain network node. The throughput is usually measured in bits per seconds (bit/s or bps), and sometimes in data packets per seconds or data packets per time slot. Another form of the throughput estimate is an efficiency measure, determined in bit/Hz, and yet another throughput estimate is formed by any quantity forming a measure for latency. Different embodiments of the operating method use one or more of the mentioned quantities for determining the throughput estimate.

The method of the present invention is particularly advantageous for implementation in terminal devices currently considered as high-end devices. In such devices, which typically support latest technologies such as LTE and multi-carrier HSDPA, the question "which network currently provides best opportunities for high throughput?" cannot simply be answered by choosing the latest technology. For instance, LTE and multi-carrier HSDPA have the same Shannon limit. This means that under the same conditions, such as same bandwidth, same MIMO scheme, and similar signal strength, they achieve the same theoretical maximum throughput. In this situation, the method of the present invention provides a new framework for embodiments which comprise determining additional parameters such as radio-cell availability or support of particular features by a respective network, and therefore allows a selection of the most suitable network configuration for a given throughput requirement.

Subsequently, embodiments of the operating method of the present invention will be described.

Different embodiments make use of different solutions for responding to receiving an input regarding a selection of a network configuration or its associated current throughput estimate determined.

In one such embodiment, the method of the first aspect of the present invention further comprises, in response to receiving the input indicative of a selection of the at least one of the output network configurations, determining an authentication and identification record allocated to the selected at least one network configuration stored in a local authentication and identification entity and associated with the throughput estimate;
registering the terminal device to the selected network configuration using the determined authentication and identification record.

In the present embodiment, the authentication and identification records are stored locally in a local authentication and identification entity, and each of the authentication and identification records is associated with a throughput value or a range of throughput values that can be achieved by using the respective authentication and identification record for registering to a network configuration associated with it. The associations are in one form of this embodiment stored in table form. An example of such a table allocates to a given network configuration an authentication and identification record and a throughput value or throughput-value range that can be achieved.

In an alternative embodiment, the method further comprises, after providing the output, waiting for an input indicative of a selection of the at least one of the output network configurations in response to receiving the input indicative of a selection of the at least one of the output network configurations, contacting, based on locally stored initial access and authentication information, a remote provisioning server;

requesting from the remote provisioning server an authentication and identification record allocated to the selected network configuration associated with the throughput estimate;

receiving the requested authentication and identification record from remote provisioning server and storing the received authentication and identification record locally, in particular in a local authentication and identification entity;

registering the terminal device to the selected network configuration using the determined authentication and identification record.

In this embodiment, the terminal device need not have a local authentication and identification entity, such as a authentication and identification module. In a variant, a local identification and authentication entity is present, but only identifies locally stored initial access and authentication information upon receiving the information on the selected network configuration, and triggers a request transmitted by the terminal device to a remote provisioning server. By doing so, the requested access and authentication information can be downloaded to the terminal device and be used for registering with the selected network. Preferably, the downloaded data are stored in a local access and authentication module. The remote provisioning server provides access and authentication information available for download.

The involvement of a provisioning server is advantageous as it allows avoiding a local handling, at the terminal device, of various access and authentication information. In particular it can be avoided to manually pick in response to the output indicative of the respective network configuration an appropriate identification and authentication module and provide it to the terminal device.

In a variant, the terminal device is configured to use one of both alternatives for registering to a selected network, depending on the network selected. This variant provides a high degree of flexibility and allows saving hardware expenditure and hardware maintenance in case a subscription of the terminal device is changed or extended by another network configuration option for registering.

Some embodiments comprise performing the method of the first aspect of the present invention in a registered state only. Other embodiments additionally comprise performing the method in a non-registered state, such that the feature is an option. In preferred embodiments, the method of the present invention is performed only while the terminal device is operated in a non-registered state and while it is without access to any identification and authentication record. This embodiment can for instance be used advantageously towards the end of a time span, during the device has been in a non-registered state, or upon initial start-up of the terminal device, in order to determine a suitable network configuration, under which operation of the terminal device involving radio communication with a network shall commence.

However, as an alternative or in addition to performing the method while operating the terminal device in a non-registered state without access to any identification and authentication record, other embodiments perform the method under access to a given authentication and identification record, such as under access to a multi-operator subscriber identification module. Access is typically achieved by entering a personal identification number. Variants allowing performing both alternatives perform the alternative methods at different times, depending on whether at a given time the terminal device is operated in a non-registered state or under access to an authentication and identification record.

In a further embodiment, the method comprises, before determining the respective throughput estimate determining a current value of a quantity indicative of a radio signal quality of the respective predefined control channel and using the determined radio signal quality in determining the throughput estimate associated with the respective ascertained network-configuration information.

Suitable examples of a quantity indicative of a radio signal quality of the respective control channel are for instance a radio signal strength indicator (RSSI), a reception level (RXLEV), values indicative of a signal-to-noise-ratio (SINR), or values of the energy per bit to noise power spectral density ratio ($E_b/N_0$), received signal code power (RSCP) values, reference signal received power (RSRP) values, reference signal received quality (RSRQ) values, in particular for LTE, and carrier to interference ration (C/I), in particular for HSDPA.

In one variant of the present embodiment, the quantity indicative of the radio signal quality is determined at the time of ascertaining the network-configuration information. In another variant, the radio-signal quality information is determined after receiving the input indicative of a selection of at least one of the output network configuration. The second variant may be performed in addition to the first variant.

A further embodiment of the method additionally comprises comparing any determined network configuration information indicative of a throughput estimate or any determined radio signal quality in any of the frequency bands receivable by the terminal device with a respective predetermined threshold discarding any frequency band falling below threshold as not receivable. This allows providing a filtered output that makes a selection of a suitable network configuration easier for a user. In another embodiment, the originally ascertained network configurations are filtered according to the determined throughput estimate, for instance by employing a lower threshold value for the desired value of the throughput estimate. In another variant, the terminal device detects certain predefined network-configuration information in the determined set of information, for instance an indicator that a given network configuration is associated with a 2G technology. The determination of such predefined information is used to discard detected network configuration information as unsuitable. In the given example this is advantageous if the maximum throughput that is achievable with 2G technologies is too low to fulfill the required throughput characteristics.

In a further embodiment, determining the throughput estimate comprises looking up a throughput value that is allocated to a determined radio signal quality in a stored table. Using a stored table is the expenditure for determining the throughput estimate. This embodiment is particularly suitable for certain techniques, such as a 64-QAM modulation-scheme.

In a further embodiment, in response to a selection of two or more network configurations, the selection is narrowed down to exactly one of the selected network configurations using one of the highest radio signal quality and the estimated throughput among the selected network configurations as an additional selection criterion. This embodiment is preferably used only in connection with operating the terminal device with a multi-operator subscriber identification module. For instance, any available LTE network configuration has been selected by user input. The present embodiment allows automatically determining the best LTE network configuration according to a quality or throughput estimate.

A further embodiment of the method comprises receiving an input comprising a service-type information, which is indicative of a service type to be requested by the terminal device, ascertaining a target throughput value allocated to the service type to be requested; after determining the estimate of the currently achievable data throughputs associated with the respective ascertained network-configuration information, performing a preselection of those suitable network configurations that allow achieving the target throughput value, and generating and providing the output, which is indicative of at least one of the determined throughput estimates for the respective network configurations, only for those network configurations, which have been determined as being suitable for achieving the target throughput value. Service type information is preferably associated with actual bearer attributes as known from standards, such as listed in TS23.107 (3GPP TS 23.107 V11.0.0 (2012-06)), Table 4 page 28. Measured conditions of the networks are mapped to theoretical feasible bearer attributes of each network, and they are preselected in accordance with the desired service type.

A target throughput may for instance be defined as a maximum achievable throughput. However, in a variant, the target throughput is defined as a threshold value defining a predefined lower throughput limit that is known to be sufficiently high in a given data communication context. This allows for instance selecting network configurations other than those providing latest technologies such as LTE in case the required throughput is known to be low enough to be served by other technologies than LTE.

In one embodiment, different throughput targets are defined for different data communication contexts, in which one and the same terminal device may operate.

In a further embodiment of the present invention, the terminal device is a radio module, and the command, the output and the input are provided from and to an external device via at least one interface. In one example, the interface is an AT interface. In another embodiment, the interface is a JAVA interface.

According to a second aspect of the present invention, a terminal device is provided, which is configured for radio communication via different frequency bands. The terminal device comprises a radio communication unit, which is configured to perform a network scan, and in performing the network scan, to attempt a synchronization with predefined control channels on all receivable frequency bands or on or a subset thereof comprising a plurality of the frequency bands, and, upon successful synchronization with a respective one of the control channels, to ascertain and provide at its output respective network-configuration information ascertained from the respective control channel of a respective network;

an evaluation unit, which is connected with the radio communication unit and configured to determine, using the network-configuration information ascertained by the radio communication unit, an estimate of a quantity indicative of an achievable data throughput, hereinafter throughput estimate, associated with the respective ascertained network-configuration information; to generate and provide at its output throughput information, which is indicative of at least one of the determined throughput estimates for the respective network configurations;

an identification and authentication unit, which is configured to control access to a plurality of identification and authentication modules or to a multi-network identification and authentication module; and an interface unit, which is connected with the evaluation unit and with the identification unit, and which is configured to output the ascertained throughput information for the ascertained network configurations, and to receive an input indicative of a selection of at least one of the ascertained network configurations.

The terminal device of the second aspect of the present invention shares the advantages achieved with the operating method of the first aspect of the invention.

In the following, embodiments of the terminal device will be explained.

In one embodiment, the identification and authentication unit is further configured, in response to receiving an input indicative of the selection of the at least one of the network configurations,
a) either, in a first alternative, to determine an authentication and identification record allocated to the selected at least one network configuration stored in a local authentication and identification entity and associated with the estimated throughput estimate; or
b) in a second alternative, to contact, based on locally stored initial access and authentication information, a remote provisioning server; to request from the remote provisioning server an authentication and identification record allocated to the selected network configuration associated with the throughput estimate; and to receive the requested authentication and identification record from remote provisioning server and storing the received authentication and identification record locally, in particular in a local authentication and identification entity;

In both alternatives a) and b), the identification and authentication unit is further configured to register the terminal device to the selected network configuration using the determined authentication and identification record. A further embodiment of the terminal device combines the capabilities of the first and second alternatives.

In another embodiment, the radio communication unit is configured to determine, before determining the respective throughput estimate, a current value of a quantity indicative of a radio signal quality of the respective predefined control channel, and to use the determined radio signal quality in determining the throughput estimate associated with the respective ascertained network-configuration information. One example of a suitable quantity indicative of a radio signal quality of the control channel is a signal to noise ratio on the used control channel. Other suitable examples will be given further below in the context of the description of embodiments with reference to the figures.

In a further embodiment, the radio communication unit is configured to compare any determined network configuration information indicative of a throughput estimate or any determined radio signal quality in any of the frequency bands receivable by the terminal device with a respective predetermined threshold and to discard any frequency band falling below the radio signal-strength threshold as not receivable. One variant of this embodiment has an evaluation unit, which is configured to narrow this selection down, in response to a selection of two or more network configurations, to exactly one of the selected network configurations, using for instance the highest signal quality among the selected network configurations as an additional selection criterion. An additional suitable criterion is the throughput estimate received determined for a network configuration.

In a further embodiment, the interface unit comprises a user interface, which is configured to output the ascertained throughput information for the ascertained network configurations, and to receive the input indicative of the selection of at least one of the ascertained network configurations. The user interface may for instance take the form of a keyboard, a graphical user interface, or an acoustic user interface.

In another embodiment, the interface unit is configured to receive an input comprising a service-type information, which is indicative of a service type to be requested by the terminal device. Furthermore, the evaluation unit is configured to ascertain a target throughput value allocated to the service type to be requested, and, after determining the throughput estimate associated with the respective ascertained network-configuration information, to perform a preselection of those suitable network configurations that allow achieving the target throughput value, and to generate and provide the output, which is indicative of at least one of the determined throughput estimates for the respective network configurations, only for those network configurations, which have been determined as being suitable for achieving the target throughput value.

A preferred embodiment of the terminal device forms a radio module for machine-to-machine communication and does not have a user interface. The interface unit comprises an AT interface or a Java interface for communicating with an external device via Hayes commands via the AT interface or Java commands via the Java interface and is configured to provide the output of the ascertained throughput information for the ascertained network configurations and to receive the input indicative of the selection of at least one of the ascertained network configurations in the form of Hayes commands via the AT interface or Java commands via the Java interface. Besides the mentioned examples of suitable interfaces any other interface providing access to the required radio module functionality can be chosen.

A further preferred embodiment forms a communication device comprising a terminal device according the previous embodiment and a user interface device that comprises user input means, user output means and an AT interface or a Java interface, wherein the terminal device and the user interface device are configured to communicate with each other through their respective AT or Java interfaces.

In the following, further embodiments will be described with reference to the enclosed drawings. In the drawings.

Figure 1:
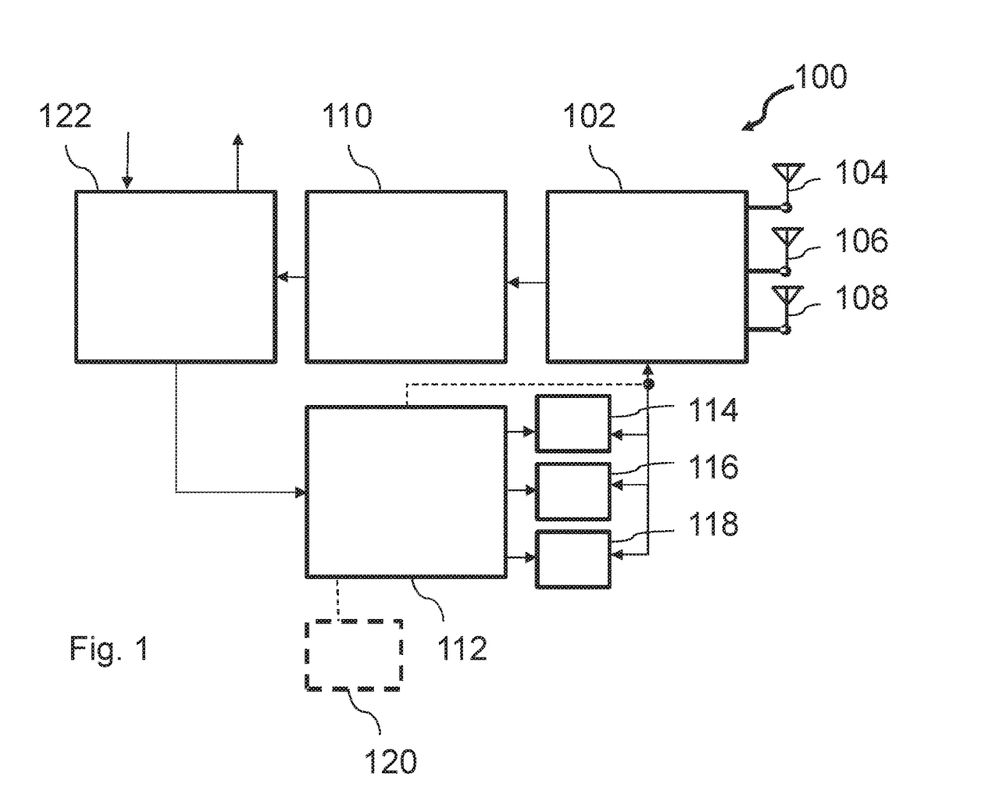
FIG. 1 shows a block diagram of an embodiment of a terminal device in accordance with the present invention.

FIG. 1 shows a block diagram of an embodiment of a terminal device 100 in accordance with the present invention. The terminal device 100 is configured for radio communication via different frequency bands using its radio communication unit 102. The radio communication unit is connected with three different antennas 104, 106 and 108 covering different frequency bands, which is to be understood as a non-limiting example. Other embodiments of the terminal device have capability for radio communication via two different frequency bands, further embodiments have the capability for radio communication via more than three different frequency bands. Support of MIMO (multiple-in-multiple-out) radio communication is provided by the radio communication unit 102 in yet another group of embodiments, requiring a plurality of antennas alone for the respective frequency band, on which MIMO communication is to be performed.

The radio communication unit 102 controls the radio-frequency exchange of the terminal device 100 with corresponding network nodes via the different frequency bands. As such, the radio communication unit 102 is configured to synchronize with predefined control channels on all receivable frequency bands and retrieve information provided via any of the control channels upon successfully achieving synchronization with a respective control channel. Among this information is network-configuration information. The radio communication unit 102 ascertains and provides at its output respective network-configuration information ascertained from the respective control channel.

The terminal device 100 further comprises an evaluation unit 110, which is connected with the radio communication unit 102. The evaluation unit receives the network-configuration information ascertained by the radio communication unit 102. The evaluation unit uses this network-configuration information to determine an estimate of a quantity that is indicative of an achievable data throughput via the respective frequency band. This information is provided at the output of the evaluation unit 110. In a variant, the evaluation unit is additionally configured to filter the determined throughput estimates and to provide at least one of the evaluated network configuration information, but less than the total number of evaluated network configurations.

The terminal device 100 further comprises an identification and authentication unit. The identification and authentication unit 112 controls registration procedures performed by the radio-communication unit 102 under access to a respective one of a plurality of identification and authentication modules. In the present example, three identification and authentication modules 114, 116 and 118 are shown as a non-limiting example. In one variant, at least one of the identification and authentication modules 114 to 118 is a multi-network identification and authentication module that provides access to a plurality of network configurations. In another variant, no local identification and authentication module is provided.

The terminal device 100 further comprises an interface unit 122. The interface unit is connected with evaluation unit 110 and with the identification and authentication unit 112. The interface unit 122 is configured to provide as an output to an external device the ascertained throughput estimate for the ascertained network configurations. Further, the interface unit 122 is configured to receive an input from external units, which is indicative of a selection of at least one of the ascertained network configurations. The received input is forwarded by the interface unit 122 to the identification and authentication unit 112.

Next, with reference to FIG. 1 and FIG. 2 in parallel, an operating method for a terminal device such as the terminal device 100 of FIG. 1 will be described. However, it is noted that the method is not restricted to a terminal device having the particular structure shown in FIG. 1. The functionalities of the different units of the terminal device 100 may be implemented in another form to allow performing the method aspects of the present invention, such as the present embodiment of FIG. 2.

Figure 2:
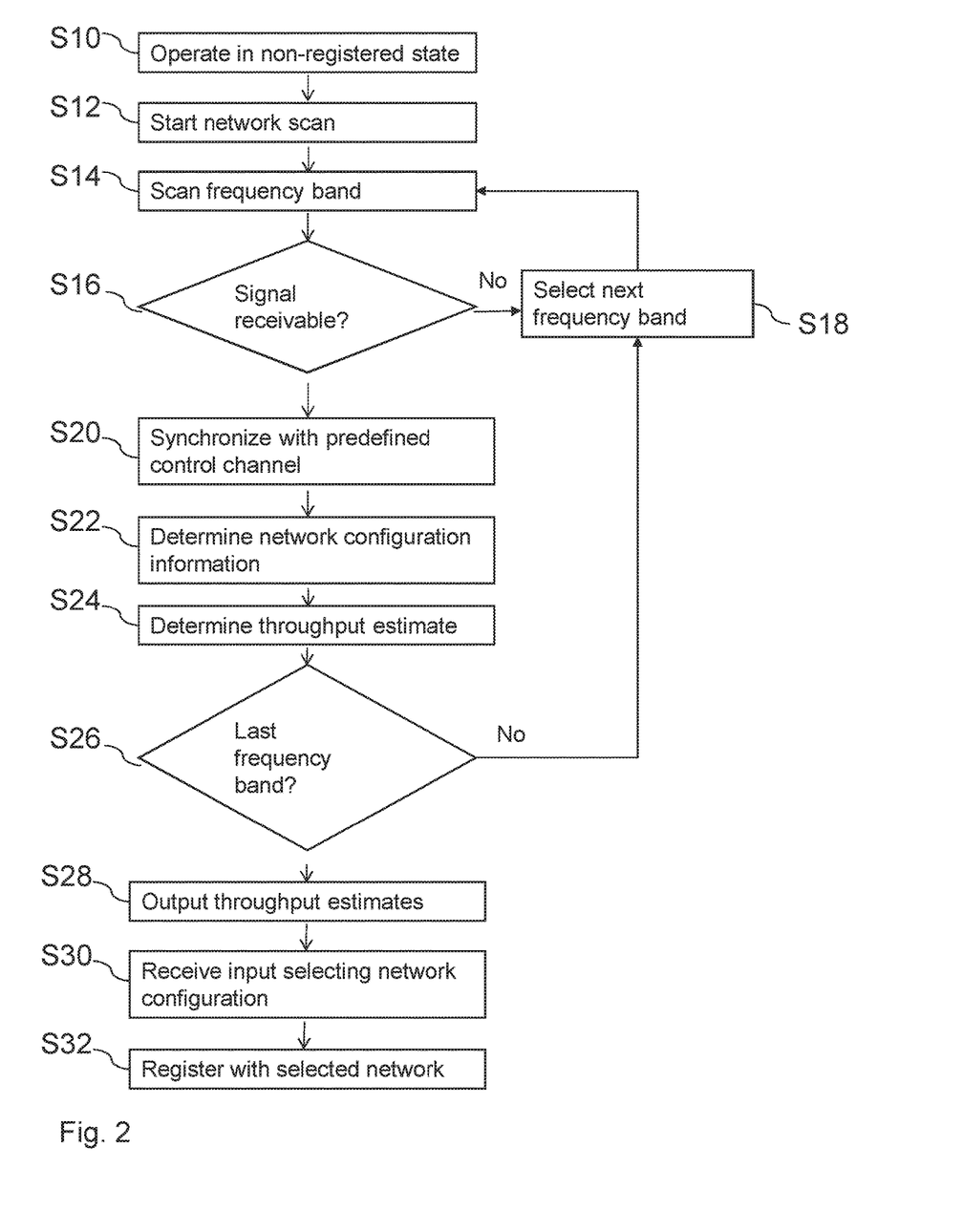
FIG. 2 is a flow diagram showing an embodiment of a method for operating a terminal device in accordance with the present invention.

For exemplary purposes, the terminal device is assumed to operate in a non-registered state initially (step S10) in the present embodiment of FIG. 2. However, this assumption is not a limiting requirement for all embodiments of the present invention. Rather, it is in the form of a preferred embodiment that the operating method of FIG. 2 is restricted in its applicability to a terminal device operating in a non-registered state. Other embodiments allow operating the terminal device in a registered state at the time of performing the method of FIG. 2. An example of a registered state, which is suitable as a starting point for performing the method is for instance an idle mode of operation, in which a request for performing radio communication is received by the terminal device 100.

With a step S12, the network scan is started. The start of the network scan is in one embodiment triggered by a control signal received from an external unit, such as an external application device via the interface unit 122 of the terminal device 100. In another embodiment, the trigger for starting the network scan is generated internally by internal operational control of the terminal device 100. In different variants of this latter embodiment, the radio communication unit 102 generates a trigger for starting the network scan upon detecting a predefined operating condition. For example, a network scan is started in one of such variants upon start-up of the terminal device 100. In another variant, the trigger signal is generated by the radio communication unit 102 upon receiving a request for radio communication while operating in a non-registered state.

Subsequently, a scan of a first frequency band supported by the radio communication unit 102 is performed (step S14). In performing the scan for a given frequency band it is first determined whether a signal is receivable from a radio communication network in the selected frequency band (step S16). If no signal is receivable, the process continues with selecting the next frequency band to be scanned (step S18) and branching back to step S14 to perform the scan.

However, if a signal is receivable in the selected frequency band, the radio communication unit 102 attempts to synchronize with a predefined control channel on that frequency band (step S20). Upon successful synchronization with the control channel, the radio communication unit 100 receives network configuration information available via the predefined control channel (step S22).

Suitable control channels to be used in the context of the process are for instance so-called common control channel like the broadcast control channel BCCH used in 2G and 3G-technologies, or the corresponding the broadcast channel (BCH) and the downlink shared channel (DL-SCH) in 4G-technologies providing the so-called master-information block (MIB) and the system-information blocks (SIBs), respectively.

The network-configuration information provided in 3G technologies via the BCCH is specified in TS25.331 The network configuration information provided in the form of system information messages that describe an identity, configuration and available features of a base transceiver station (BTS), Node B or eNodeB, and include for instance frequency bands, bandwidth, modulation and coding schemes, the number of parallel channels available, MIMO parameters, special technology features such as EDGE support in 2G, HSDPA or HSUPA in 3G, etc. HSDPA support is for instance indicated in the System Information provided within the BCCH as defined in 3GPP TS 25.331 V10.11.0 (2013-03) S, 664, section 10.2.48.8.4, or a multicarrier indicator (Multiple Frequency Band indicator list) in section 10.2.48.8.9.

For LTE (4G) such information is provided in TS36.331 (3GPP TS 36.331 V11.5.0 (2013-09)). As an example, on page 132 of this document the structure of the master information block is shown, which indicates the number of available resource blocks or the downlink bandwidth (DL-Bandwidth) as provided by the LTE cell. Several control channels may be scanned, if suitable for ascertaining parameters associated with a given (single) network configuration and for obtaining all information required to ascertain a throughput estimate for it.

In a subsequent step S24, the mobile terminal 100, in the embodiment of FIG. 1 in particular the evaluation unit 110, determines a throughput estimate for the network configuration under consideration. The throughput estimate is in one embodiment determined by suitable calculation using the parameters received from the network via the control channel. In another embodiment, the throughput estimate is determined by accessing a lookup-table that is stored in the evaluation unit and allocates values of throughput estimates to different sets of network configuration information.

To this end, the terminal device 100 measures a signal to noise ratio on the reference control channel (e.g., BCCH). For each technology there is a certain modulation and coding scheme to be applied for a certain signal to noise ratio (SNR). For instance in LTE (4G) a total throughput estimate can be calculated based on table in standard (TS36.213 table 7.2.3-1) which is adapted to realistic receiver implementations.

TABLE 1

3GPP TS 36.213 version 10.1.0 Release 10, Table 7.2.3-1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8870 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 16QAM | 466 | 2.7305 |
| 11 | 16QAM | 567 | 3.3223 |
| 12 | 16QAM | 666 | 3.9023 |
| 13 | 16QAM | 772 | 4.5234 |
| 14 | 16QAM | 873 | 5.1152 |
| 15 | 16QAM | 948 | 5.5547 |

An efficiency value determined from this table multiplied with bandwidth supported provides an estimate of a maximum throughput. For instance, if the determined bandwidth is 20 MHz, the throughput estimate for a measured CQI index of 12 is in the range of 78 Mbps. A prediction on the achievable CQI based on the SNR is set out in the reference Mohammad T. Kawser et al., Downlink SNR to CQI Mapping for Different Multiple Antenna Techniques in LTE, International Journal of Information and Electronics Engineering, Vol. 2, No. 5, September 2012, pp. 757ff, in particular in FIG. 6 and Table III.

Similarly, throughput estimates can be achieved for 3G/WCDMA based on Transport Block sizes as e.g. listed in Tables 7A to 7E of 3GPP TS 25.214 V5.11.0 (2005-06): Again the observed signal strength (RSCP) and quality (Ec/No) on downlink (reference) channels can be used to determine a likely achievable Channel Quality indicator (CQI) and then, taking the capabilities of the mobile terminal (i.e. "UE category") into account, the Transport Block size gives a metric for the achievable data throughput.

In 2G/GSM/GPRS, achievable coding schemes and error rates can be estimated based on received Signal Level and Quality ("RXLEV" and "RXQUALI", see e.g. sections 8.1 and 8.2 of 3GPP TS 05.08 V8.23.0 (2005-11)). Again, the achievable coding scheme (CS-1 to CS-4) is relevant for calculating this throughput estimate.

Subsequently, in step S26, the mobile terminal determines whether the frequency band just scanned is the last frequency band to be scanned. If there is another frequency band to be scanned, the process branches back to step S18 in order to select a next frequency band, followed by starting the procedure for the next frequency band with step S14.

It is noted that the flow diagram of FIG. 2 is simplified and as such does not cover a proper handling of a case, in which the last frequency band scanned does not provide a receivable signal. However, in that case, the process will not proceed from step S16 to step S18, but jump from step S16 to the next step to be described, which is step S28.

In this step S28, the determined throughput estimates are output, and subsequently, input is expected selecting a specific network configuration. After receiving such input selecting a specific network configuration in step S30, the process continues with the terminal device registering to the selected network in step S32. The registering may be performed by any of the variants described in the following.

In one variant, the terminal device, in the embodiment of FIG. 1 in particular the identification and authentication unit 112, controls access of the radio-communication unit 102 to a plurality of local identification and authentication modules. In the terminal device of FIG. 1, three identification and authentication modules 114, 116 and 118 are used as a non-limiting example. As mentioned in the context of FIG. 1, each of the identification and authentication modules 114 to 118 provides identification and authentication records enabling access to either one or a plurality of network configurations. Thus, after reception of an input selecting a specific network configuration, the terminal device accesses the corresponding identification and authentication module to obtain the identification and authentication record required for access to the selected network configuration.

In another variant, the identification and authentication identifies locally stored initial access and authentication information upon receiving the information on the selected network configuration and triggers a request transmitted by the terminal device to a remote provisioning server, which request is transmitted by the radio communication unit 102 in the embodiment of FIG. 1. The request is directed to receiving a full authentication and identification record based on the locally stored initial access and authentication information, which points to a selected network configuration. The authentication and identification record is received back from the provisioning server and, according to one option, stored by the identification and authentication unit in a local memory 120 that is access-restricted and forms a local authentication and identification entity. According to another option, the received authentication and identification record is not stored. However, according to any of these options, it is used for registering with the selected network configuration.

Both described variants for registering are provided in parallel for registration with different network configurations in certain embodiments.

Figure 3:
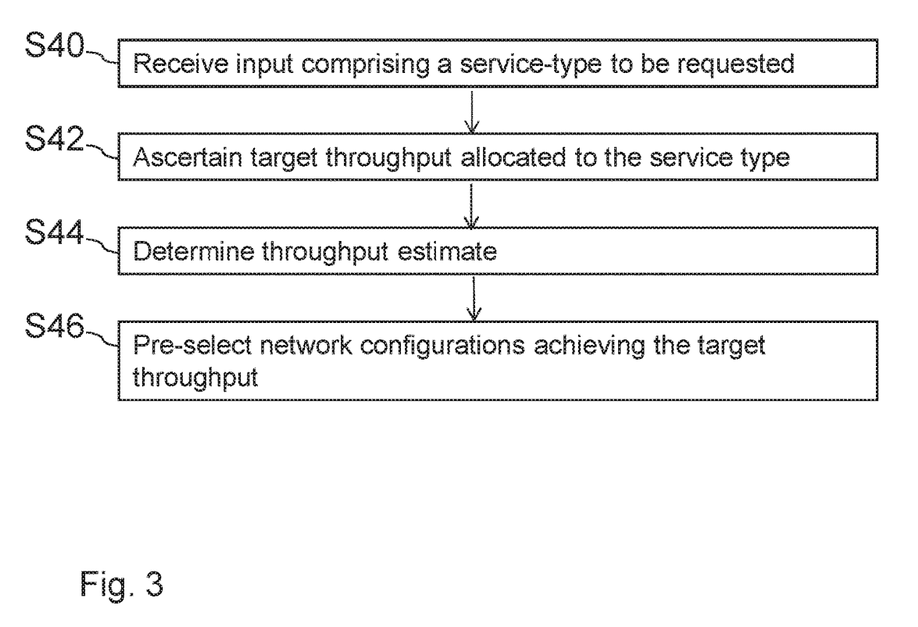
FIG. 3 is a flow diagram showing a variant of the embodiment of FIG. 2.

FIG. 3 is a flow diagram showing a variant of the embodiment of FIG. 2. In the variant of FIG. 3, the method of FIG. 2 is modified as described in the following. In addition to the processing steps performed in the method according to FIG. 2, the method of the present embodiment comprises the terminal 100 receiving an input that determines a service-type to be requested from the network (step S40). The step S40 may be performed between step S10 and S12 or any time after step S26 and before step S32. In response to receiving the mentioned input, the evaluation unit 110 of the mobile terminal 100 determines input that is allocated to the requested service type (step S42). Ascertaining this target throughput may for instance be performed by accessing a further lookup-table, which provides a target throughput value for service types that may be requested. In step S44, the throughput estimates are determined as described in the context of the method of FIG. 2, steps S14 to S26. However, as mentioned, the determination of the throughput estimates may be performed before the steps S40 and S42. After determining the throughput estimate, those network configurations determined in the process of FIG. 2 which achieve the target throughput or a higher throughput estimate, are pre-selected, and other network configurations that do not achieve the target throughput are discarded. Only those pre-selected network configurations are than output in step S28.

The invention claimed is:

1. An operating method of a terminal device, which is configured for radio communication via different frequency bands, further being configured to control access to a plurality of identification and authentication information or to a multi-network identification and authentication information, in performing a network scan, the method comprising:
   receiving a command for starting a network scan;
   in response to receiving the command, attempting a synchronization with predefined control channels on all frequency bands receivable by the terminal device or on a subset thereof comprising a plurality of the frequency bands, and, upon successful synchronization with a respective one of the control channels, ascertaining respective network-configuration information provided via the respective control channel by a respective network;
   determining, using the network-configuration information ascertained, an estimate of a quantity indicative of an achievable data throughput, hereinafter throughput estimate, associated with the respective ascertained network-configuration information;
   generating and providing an output, which is indicative of at least one determined throughput estimate for the respective network configuration; and
   after providing the output, waiting for an input indicative of a selection of at least one of a plurality of output network configurations.

2. The method of claim 1, further comprising:
   in response to receiving the input indicative of a selection of the at least one of the output network configurations, determining an authentication and identification record allocated to the selected at least one network configuration stored in one of the plurality of identification and authentication information associated with the throughput estimate; and registering the terminal device to the selected network configuration using the determined authentication and identification record.

3. The method of claim 1, further comprising:

after providing the output, waiting for an input indicative of a selection of the at least one of the output network configurations;

in response to receiving the input indicative of a selection of the at least one of the output network configurations, contacting, based on locally stored initial access and authentication information, a remote provisioning server;

requesting from the remote provisioning server an authentication and identification record allocated to the selected network configuration associated with the throughput estimate;

receiving the requested authentication and identification record from the remote provisioning server and storing the received authentication and identification record locally, in particular in a local authentication and identification entity; and registering the terminal device to the selected network configuration using the determined authentication and identification record.

4. The method of claim 1, further comprising:

performing the method only while operating the terminal device in a non-registered state without access to any identification and authentication record.

5. The method of claim 1, further comprising, before determining the respective throughput estimate, determining a current value of a quantity indicative of a radio signal quality of the respective predefined control channel; and using the determined radio signal quality in determining the throughput estimate associated with the respective ascertained network-configuration information.

6. The method of claim 1, further comprising comparing retrieved network configuration information or a throughput estimate or a determined radio signal quality in any of the frequency bands receivable by the terminal device with a respective predetermined threshold; and discarding any frequency band falling below threshold as not receivable.

7. The method of claim 1, wherein, in response to a selection of two or more network configurations, the selection is narrowed down to exactly one of the selected network configurations using one of the highest radio signal quality and the estimated throughput among the selected network configurations as an additional selection criterion.

8. The method of claim 1, further comprising receiving an input comprising a service-type information, which is indicative of a service type to be requested by the terminal device, ascertaining a target throughput value allocated to the service type to be requested;

after determining the estimate of the currently achievable data throughputs associated with the respective ascertained network-configuration information, performing a pre-selection of those suitable network configurations that allow achieving the target throughput value, and generating and providing the output, which is indicative of at least one of the determined throughput estimates for the respective network configurations, only for those network configurations, which have been determined as being suitable for achieving the target throughput value.

9. The method of claim 1, wherein the terminal device comprises a radio coupled to an antenna, and wherein the command, the output and the input are provided from and to an external device via at least one interface.

10. A terminal device, which is configured for radio communication via different frequency bands, the terminal device comprising:

a processor;

a memory; and a radio coupled to an antenna, which is configured to perform a network scan, and in performing the network scan, to attempt a synchronization with predefined control channels on all receivable frequency bands or on or a subset thereof comprising a plurality of the frequency bands, and, upon successful synchronization with a respective one of the control channels, to ascertain and provide at its output respective network-configuration information ascertained from the respective control channel; and wherein the processor, is connected with the radio and configured to determine, using network-configuration information ascertained by the radio, an estimate of a quantity indicative of an achievable data throughput, hereinafter throughput estimate, associated with the respective ascertained network-configuration information;

to generate and provide at its output throughput information, which is indicative of at least one of the determined throughput estimate for the respective network configuration;

to control access to a plurality of identification and authentication information or to a multi-network identification and authentication information, and to output the ascertained throughput estimate for the ascertained network configuration, and to receive an input indicative of a selection of at least one of the ascertained network configuration.

11. The terminal device of claim 10, wherein the processor is further configured, in response to receiving an input indicative of the selection of the at least one of the network configurations, either, in a first alternative, to determine an authentication and identification record allocated to the selected at least one network configuration stored in a local authentication and identification entity and associated with the estimated throughput estimate; or or, in a second alternative, to contact, based on locally stored initial access and authentication information, a remote provisioning server;

to request from the remote provisioning server an authentication and identification record allocated to the selected network configuration associated with the throughput estimate; and to receive the requested authentication and identification record from the remote provisioning server and storing the received authentication and identification record locally, in particular in a local authentication and identification entity;

and, in both alternatives,
to register the terminal device to the selected network configuration using the determined authentication and identification record.

12. The terminal device of claim 10, wherein the processor is configured to determine, before determining the respective throughput estimate, a current value of a quantity indicative of a radio signal quality of the respective predefined control channel, and to use the determined radio signal quality in determining the throughput estimate associated with the respective ascertained network-configuration information.

13. The terminal device of claim 10, wherein the processor is configured to compare any determined network configuration information indicative of a throughput estimate or any determined radio signal quality in any of the frequency bands receivable by the terminal device with a respective predetermined threshold and to discard any frequency band falling below the radio signal-strength threshold as not receivable.

14. The terminal device of claim 10, further comprising a user interface, which is configured to output the ascertained throughput information for the ascertained network configurations, and to receive the input indicative of the selection of at least one of the ascertained network configurations.

15. The terminal device of claim 10, wherein the processor is configured:
to receive an input comprising a service-type information, which is indicative of a service type to be requested by the terminal device,
to ascertain a target throughput value allocated to the service type to be requested, and, after determining the throughput estimate associated with the respective ascertained network-configuration information,
to perform a pre-selection of those suitable network configurations that allow achieving the target throughput value, and
to generate and provide the output, which is indicative of at least one of the determined throughput estimates for the respective network configurations, only for those network configurations, which have been determined as being suitable for achieving the target throughput value.

16. The terminal device of claim 10, which forms a radio for machine-to-machine communication and does not have a user interface, and wherein the terminal device further comprises an AT interface or a Java interface for communicating with an external device via Hayes commands via the AT interface or Java commands via the Java interface and is configured to provide the output of the ascertained throughput information for the ascertained network configurations and to receive the input indicative of the selection of at least one of the ascertained network configurations in the form of Hayes commands via the AT interface or Java commands via the Java interface.

17. A communication device comprising a terminal device according to claim 16 and an AT interface or a Java interface, wherein the terminal device is configured to communicate with other devices through the AT or Java interfaces.

* * * * *